United States Patent [19]
Reddekopp

[11] 3,907,057
[45] Sept. 23, 1975

[54] CROSSWISE MUFFLERS

[75] Inventor: Aaron Reddekopp, Portland, Oreg.

[73] Assignee: Reddekopp Muffler & Truck Equipment, Inc., Portland, Oreg.

[22] Filed: May 20, 1974

[21] Appl. No.: 471,196

[52] U.S. Cl.......... 180/64 A; 181/36 D; 280/150 R; 296/28 M
[51] Int. Cl.²........................................ B60K 13/00
[58] Field of Search....... 180/64 A, 54 A; 181/36 B, 181/60, 36 D, 36 R; 296/1 R, 28 M; 280/423 R, 150 R; 293/69, 63

[56] References Cited
UNITED STATES PATENTS

| | | | |
|---|---|---|---|
| 2,260,578 | 10/1941 | Murray............................. | 293/69 E |
| 3,047,161 | 7/1962 | Thacker.......................... | 280/150 R |
| 3,493,263 | 2/1970 | Brown.............................. | 280/150 R |
| 3,827,523 | 8/1974 | Williams........................... | 180/64 A |

*Primary Examiner*—David Schonberg
*Assistant Examiner*—David M. Mitchell
*Attorney, Agent, or Firm*—Klarquist, Sparkman, Campbell, Leigh, Hall & Whinston

[57] ABSTRACT

A horizontal, baffled muffler is secured crosswise to the chassis of a truck tractor behind the cab. The muffler forms the base of a vertical headboard having an expanded metal screen secured thereto to form a cab guard. Tail pipes secured to the headboard are connected to the ends of the muffler. The headboard carries a tool box to which chains may be secured. In another embodiment, a headboard mounted on a crosswise muffler has a notched top for holding a trailer tongue of a log truck trailer. In another embodiment, one-half of a crosswise tube is a muffler and the other half is a filter for air to the engine.

7 Claims, 9 Drawing Figures

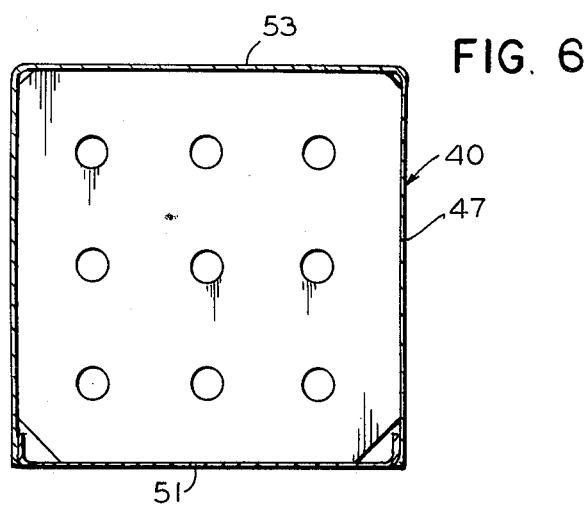
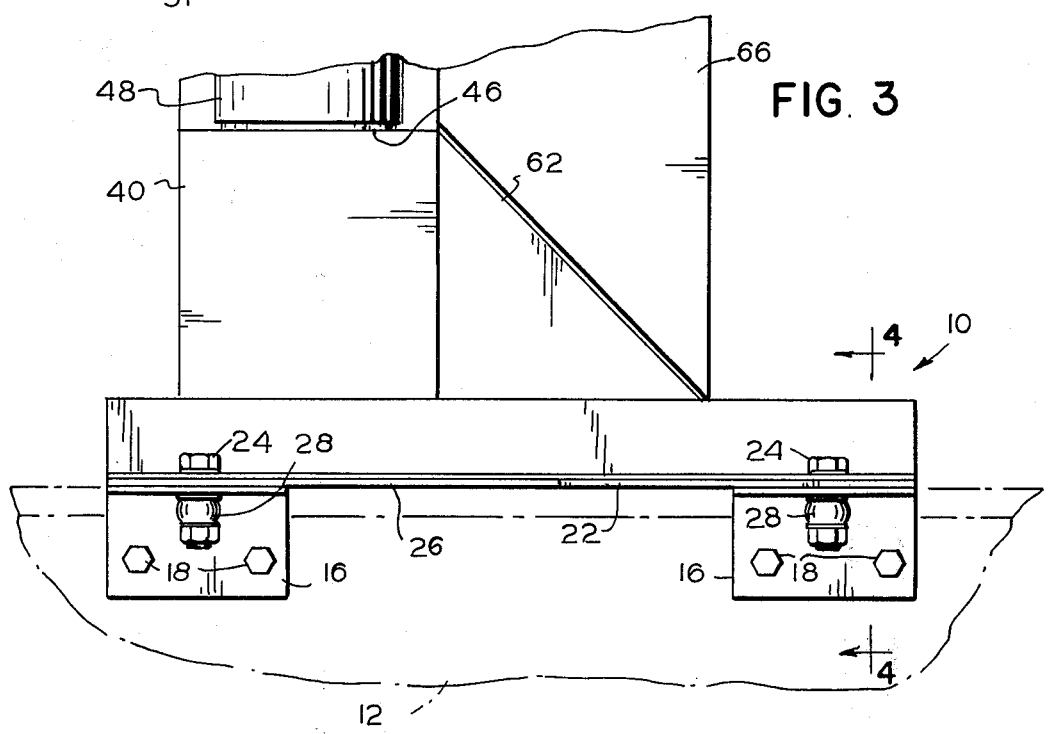
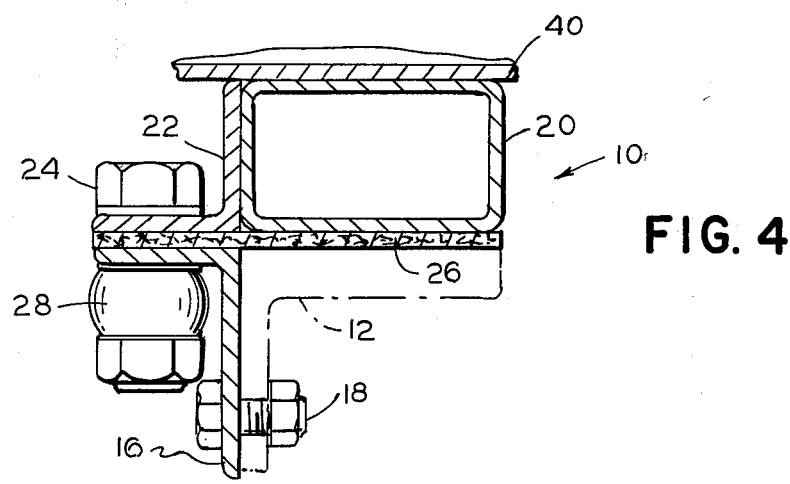

CROSSWISE MUFFLERS

DESCRIPTION

This invention relates to crosswise mufflers and has for an object thereof the provision of crosswise mufflers.

Another object of the invention is to provide a muffler assembly including a crosswise muffler tube mounted crosswise on a truck tractor chassis and a frame supporting one or more tail pipes or stacks.

Another object of the invention is to provide an assembly including a vertical headboard having as its base a muffler and vertical tail pipes connected to the muffler and headboard.

A further object of the invention is to provide a simple, unitary muffler tail pipe assembly that also acts as guard for the rear of a truck tractor cab.

Another object of the invention is to provide a headboard muffler in which a muffler mounted on a truck tractor chassis forms the base of a headboard frame to which tail pipes are secured, a tool box being secured to the frame.

Another object of the invention is to provide a crosswise muffler assembly in which a headboard supporting tail pipes has a notch-like top for receiving a log truck trailer tongue.

Another object of the invention is to provide a combined filter and muffler wherein a portion of a crosswise tube acts as a muffler for a truck tractor engine and the rest of the tube is a filter for air to the engine.

In the drawings:

FIG. 3 is an enlarged, fragmentary, side elevation view taken along line 3—3 of FIG. 1;

FIG. 4 is an enlarged, fragmentary, vertical sectional view taken along line 4—4 of FIG. 3;

FIG. 6 is an enlarged, fragmentary, vertical sectional view taken along line 6—6 of FIG. 5;

Figure 1:
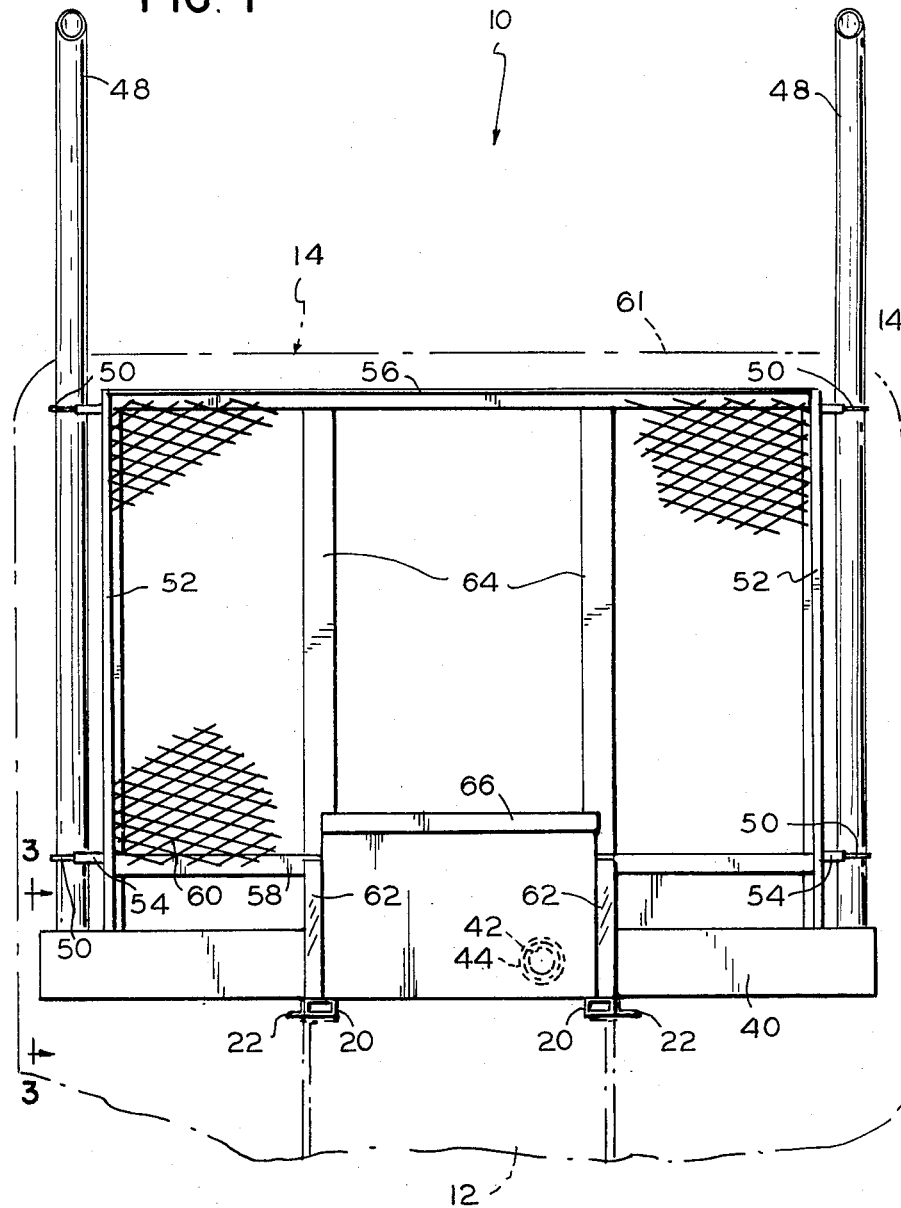
FIG. 1 is a fragmentary, rear elevation view of a truck tractor having a crosswise muffler forming one embodiment of the invention.
Figure 2:
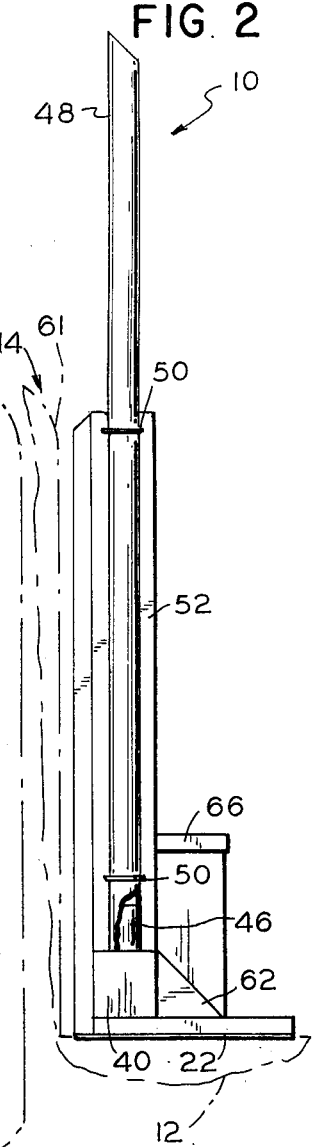
FIG. 2 is a fragmentary, side elevation view of the truck tractor and muffler of FIG. 1.
Figure 5:
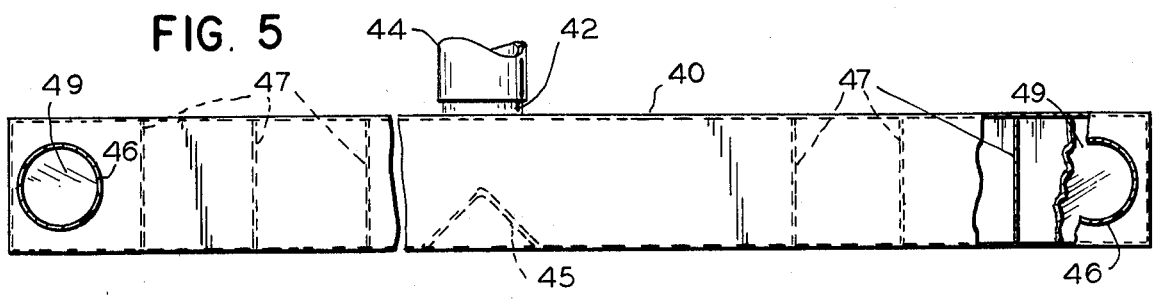
FIG. 5 is an enlarged, fragmentary, top horizontal, sectional view taken along line 5—5 of FIG. 1.

A crosswise muffler 10 forming a specific embodiment of the invention is mounted on longitudinal chassis members 12 of a truck tractor 14 by angle members 16 secured by bolts 18 to the chassis members 12. Tubular feet or base members 20 of the muffler 10 have angle members 22 welded thereto, and bolts 24 bolt the angle members 22 to the angle members 16, a cushioning pad 26 being positioned between the angle members and between the feet 20 and the tops of the chassis members 12, and resilient cushioning bushings 28 being positioned on the bolts 24.

A tubular, baffled crosswise muffler tube 40 is welded to the feet 20 and has an inlet 42 to which an exhaust pipe 44 is connected. A divider 45, baffles 47 and sloping corner deflectors 49 are welded to a bottom channel 51 which is welded to a top channel 53. Upright tubular outlets 46 of the muffler tube at the end portions thereof have vertical steel tail pipes 48 fitting tightly thereon. The tail pipes have canted, rearwardly facing outlets. U-bolts 50 secured to angular side frame members 52 clamp the tail pipes tightly against saddles 54 abutting the members 52. The members 52 are welded to the muffler tube 40 and to angular top member 56 and angular bottom member 58 to form a headboard frame. A heavy, expanded metal screen 60 is secured to the frame to form therewith a guard for the rear end of a cab 61 of the truck tractor. The entire assembly is positioned near the cab and ahead of the fifth wheel of the truck tractor. Gussets 62 and tubular uprights 64 welded to the feet 20, muffler 40 and bottom member 58 rigidify the assembly. A tool box 66 is welded to the frame and may carry chains outside thereof.

Figure 7:
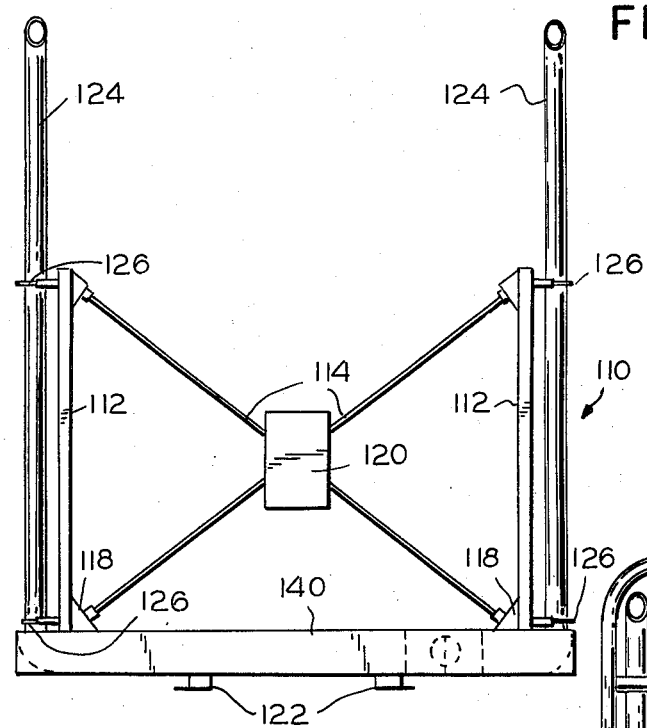
FIG. 7 is a rear elevation view of a crosswise muffler forming an alternate embodiment of the invention.

Embodiment of FIG. 7

A crosswise muffler 110 forming an alternate embodiment of the invention is like the muffler 10 (FIG. 1) but does not have a headboard. Instead, the muffler 110 has a frame including uprights 112, a baffled muffler tube 140, and crossed tie rods 114 secured by nuts to hollow connector portions 116 and 118 and, at the crossing point, a mounting plate 120. Feet 122 mount the tube on chassis members of a truck tractor behind a cab thereof. Tail pipes 124 are clamped to the uprights by U-bolts 126.

Figure 8:
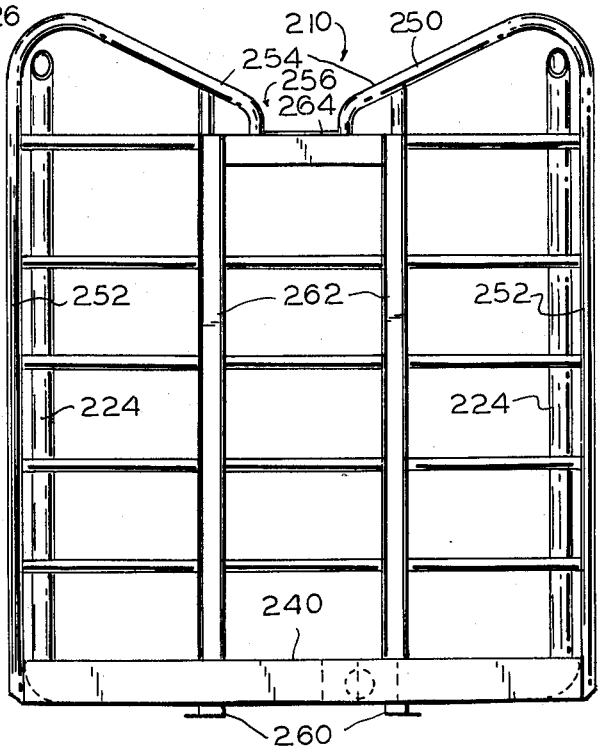
FIG. 8 is a rear elevation view of a crosswise, log truck muffler forming an alternate embodiment of the invention; and, FIG. 9 is a rear elevation view of a crosswise muffler-air filter forming an alternate embodiment of the invention.

Embodiment of FIG. 8

A crosswise muffler 210 forming an alternate embodiment of the invention is generally like the mufflers 10 and 110, but is particularly adapted for use with a log truck, and has a heavy grill-like headboard 250 having side frame members 252 welded to ends of baffled crosswise muffler tube 240. Tail pipes 224 are secured to the headboard, which includes arched top rails 254 forming a notch 256 for receiving a tongue of a log truck trailer when the latter is placed in its customary, piggyback position on the log truck. The rails 254 extend up above the tops of the tail pipes and the headboard covers the tail pipes to protect them from logs carried by the truck and trailer. Feet 260 mount the muffler tube on the truck's chassis. A heavy inner frame 262 of the headboard serves to support the trailer tongue, a pad 264 being provided at the bottom of the notch.

Figure 9:
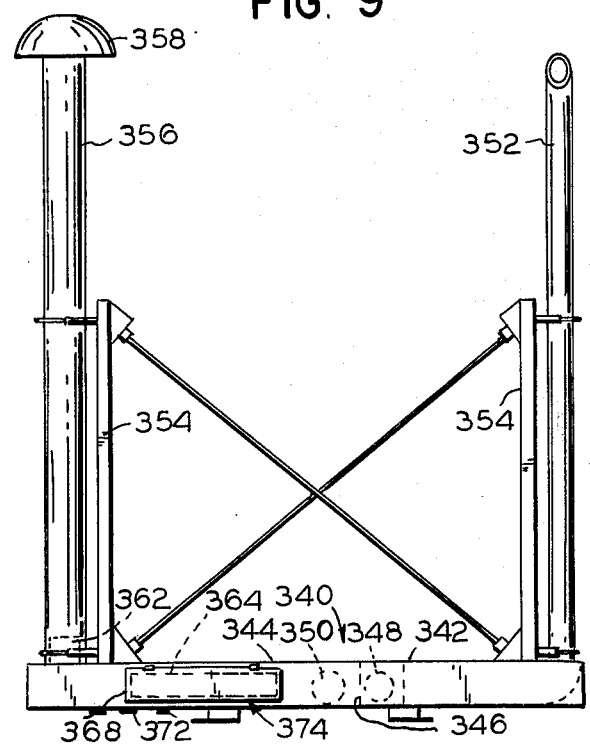

Embodiment of FIG. 9

A crosswise muffler-air filter 310 forming an alternate embodiment of the invention includes mounting feet 360 supporting crosswise tube 340 having a baffled, muffler portion 342 and an air filter portion 344. A combined deflector-partition 346 separates the interior of the tube 340 and is positioned between a muffler inlet 348 connected to the exhaust pipe of the truck tractor engine and an air outlet 350 connected to the conventional air cleaner of the engine. A tail pipe 352 is secured to frame 354 and an air inlet tube 356 having an inlet cap guard 358 is connected to air inlet 352. A filter cartridge 364 having a heavy screen exterior and foraminous filtering material interior is mounted in the air filter portion 344. The cartridge 364 is positioned for insertion and removal through a hinged door 368, and may be removed for cleaning or replacement. Feet 370 serve as a mounting base and a tool box support. water drains 372 in the form of small openings are provided in the bottom of the filter portion 344 of the tube 340. Water trapping baffles 374 also are provided. The provision of the filter minimizes cleaning of and changing oil in the conventional air cleaner on the engine.

What is claimed is:

1. In a crosswise muffler adapted to be mounted on a chassis of a truck tractor,
   a rigid tubular, horizontal base and muffler means having ends and outlets at ends thereof and adapted to be secured to the chassis behind a cab,
   cabguard frame means secured to the base and muffler means in a vertical position forming a headboard covering at least a substantial portion of the cab,
   and vertical tail pipes mounted on the frame means and connected to the outlets.

2. The crosswise muffler of claim 1 wherein the base and muffler means includes feet adapted to rest on longitudinal members of the chassis of the truck tractor.

3. The crosswise muffler of claim 2 wherein the base and muffler means forms the base of the headboard.

4. In a crosswise muffler adapted to be mounted on a chassis of a truck tractor,
   a tubular, baffled muffler adapted to be secured rigidly to the truck tractor chassis behind a cab thereof in a position extending horizontally crosswise of the chassis and having outlet means at at least one end thereof,
   upright tail pipe means connected to the outlet means,
   and frame means supported by the muffler and supporting the tail pipe means in an upright position wherein the frame means covers a substantial portion of the cab.

5. The crosswise muffler of claim 4 wherein the frame means forms a headboard positioned immediately to the rear of the cab of the truck tractor.

6. A combined cabguard and muffler for attachment to a truck tractor having a chassis and a cab,
   an upright cabguard including guard frame means having two sides and a horizontal bottom tubular member having an exhaust inlet between the ends thereof and exhaust outlet means at at least one end of the tubular member,
   means for securing the bottom tubular member to the chassis in a position in which the guard frame means of the cabguard is in an upright position on the chassis behind the cab,
   and exhaust means including the bottom tubular member and also including at least one upright tubular member fastened to one side of the guard frame means of the cabguard,
   at least one of the tubular members being a muffler, the upright tubular member serving as a tailpipe.

7. The combined cabguard and muffler of claim 6 wherein the bottom tubular member is a muffler.

* * * * *